United States Patent
McCormick et al.

(10) Patent No.: US 11,196,827 B2
(45) Date of Patent: Dec. 7, 2021

(54) DATA MANAGEMENT FOR CONNECTED DEVICES

(71) Applicant: AT&T Intellectual Property I, L.P., Atlanta, GA (US)

(72) Inventors: Shannon McCormick, Belle Mead, NJ (US); Roque Rios, III, Middletown, NJ (US); Ralph Quinto, Hazlet, NJ (US); Nikhilesh Kashyap, Monroe, NJ (US); Patrick Wellins, Watermill, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 64 days.

(21) Appl. No.: 16/668,163

(22) Filed: Oct. 30, 2019

(65) Prior Publication Data

US 2021/0136163 A1    May 6, 2021

(51) Int. Cl.
*H04L 29/08* (2006.01)
*G06N 20/00* (2019.01)

(52) U.S. Cl.
CPC ............. *H04L 67/22* (2013.01); *G06N 20/00* (2019.01); *H04L 67/146* (2013.01)

(58) Field of Classification Search
CPC ... H04L 67/22; H04L 12/141; H04L 12/1421; H04L 12/1435; H04L 43/04; H04L 43/0876; H04L 67/025; H04L 67/306; G06F 11/34; G06Q 30/0201
See application file for complete search history.

(56) References Cited

U.S. PATENT DOCUMENTS

| | | | | |
|---|---|---|---|---|
| 2012/0054661 A1* | 3/2012 | Rados | ............... | H04L 43/0876 715/772 |
| 2013/0111020 A1* | 5/2013 | Cohen | ............... | H04W 4/20 709/224 |
| 2013/0122854 A1* | 5/2013 | Agarwal | ............... | G06F 3/0482 455/405 |
| 2013/0198374 A1* | 8/2013 | Zalmanovitch | ..... | H04L 12/1435 709/224 |
| 2013/0311660 A1* | 11/2013 | Dabbiere | ............ | H04L 12/1467 709/225 |
| 2013/0316703 A1* | 11/2013 | Girard | ............... | G06Q 30/0257 455/432.1 |
| 2015/0282041 A1* | 10/2015 | Batchu | ............... | H04W 12/37 370/338 |

(Continued)

*Primary Examiner* — David R Lazaro (57) ABSTRACT

A processing system in a network identifies first and second endpoint devices subscribed to a data plan that allows the first and second user endpoint devices to transmit and receive a shared, allotted amount of data through the network. A first subset of application data associated with the data plan is classified by parsing metadata associated with the application data to identify a first group of applications to or from which the application data was sent. A second subset of the application data is classified by parsing network data associated with the application data to identify a second group of applications to or from which the application data was sent. A report indicates respective portions of the allotted amount of data consumed by individual applications in the first and second groups of applications, and how much of the respective portions were consumed by the first and second user endpoint devices.

20 Claims, 5 Drawing Sheets

(56) References Cited

U.S. PATENT DOCUMENTS

| | | | |
|---|---|---|---|
| 2016/0072904 A1* | 3/2016 | Asnis | H04L 63/0823 |
| | | | 709/224 |
| 2016/0127210 A1* | 5/2016 | Noureddin | H04M 15/854 |
| | | | 455/405 |
| 2017/0279971 A1* | 9/2017 | Raleigh | H04M 15/852 |
| 2018/0276689 A1* | 9/2018 | Zhang | G06Q 30/0631 |
| 2019/0347181 A1* | 11/2019 | Cranfill | G06F 21/6218 |
| 2019/0349469 A1* | 11/2019 | Skogen | H04L 63/10 |

* cited by examiner

DATA MANAGEMENT FOR CONNECTED DEVICES

The present disclosure relates generally to connected devices, and relates more particularly to devices, non-transitory computer-readable media, and methods for managing data consumption by connected devices.

BACKGROUND

As computing devices, and in particular mobile computing devices, have become more powerful, it has become commonplace for telecommunications service providers to provide data plans as part of a mobile service package. A data plan allows a computing device to transmit and receive data through an Internet Protocol (IP) network (e.g., a "second generation" (2G), "third generation" (3G), "fourth generation" (4G), Long Term Evolution (LTE), or "fifth generation" (5G) network, or the like). This capability allows a device such as a mobile phone, for instance, to be used for functions in addition to the traditional voice calling and simple text transmission. For example, the mobile phone could be used for gaming, video and music streaming, email, social networking, and other functions. Most commercial data plans provide a customer with a limited amount of data to use over a period of time (e.g., 10 Gigabytes per month). Even so-called unlimited data plans typically throttle data usage once a predefined threshold amount of data usage is reached.

SUMMARY

In one example, the present disclosure describes a device, computer-readable medium, and method for managing data usage over a plurality of connected devices. For instance, in one example, a method performed by a processing system in an internet protocol network includes identifying a first user endpoint device and a second user endpoint device that are subscribed to a data plan, wherein the data plan allows the first user endpoint device and the second user endpoint device to transmit and receive an allotted amount of data through the internet protocol network, and wherein the allotted amount of data is shared between the first user endpoint device and the second user endpoint device, classifying a first subset of a pool of application data associated with the data plan, wherein the classifying the first subset comprises parsing metadata associated with the first subset in order to identify a first group of applications to or from which the first subset was sent, classifying a second subset of the pool of application data, wherein the classifying the second subset comprises parsing network data associated with the second subset in order to identify a second group of applications to or from which the second subset was sent, and generating a report, wherein the report indicates respective portions of the allotted amount of data that have been consumed by individual applications in the first group of applications and in the second group of applications, and wherein the report further indicates how much of the respective portions were consumed by the first user endpoint device and how much of the respective portions were consumed by the second user endpoint device.

In another example, a device includes a processing system in an internet protocol network and a computer-readable medium storing instructions which, when executed by the processing system, cause the processing system to perform operations. The operations include identifying a first user endpoint device and a second user endpoint device that are subscribed to a data plan, wherein the data plan allows the first user endpoint device and the second user endpoint device to transmit and receive an allotted amount of data through the internet protocol network, and wherein the allotted amount of data is shared between the first user endpoint device and the second user endpoint device, classifying a first subset of a pool of application data associated with the data plan, wherein the classifying the first subset comprises parsing metadata associated with the first subset in order to identify a first group of applications to or from which the first subset was sent, classifying a second subset of the pool of application data, wherein the classifying the second subset comprises parsing network data associated with the second subset in order to identify a second group of applications to or from which the second subset was sent, and generating a report, wherein the report indicates respective portions of the allotted amount of data that have been consumed by individual applications in the first group of applications and in the second group of applications, and wherein the report further indicates how much of the respective portions were consumed by the first user endpoint device and how much of the respective portions were consumed by the second user endpoint device.

In another example, a computer-readable medium stores instructions which, when executed by a processing system of an internet protocol network, cause the processing system to perform operations. The operations include identifying a first user endpoint device and a second user endpoint device that are subscribed to a data plan, wherein the data plan allows the first user endpoint device and the second user endpoint device to transmit and receive an allotted amount of data through the internet protocol network, and wherein the allotted amount of data is shared between the first user endpoint device and the second user endpoint device, classifying a first subset of a pool of application data associated with the data plan, wherein the classifying the first subset comprises parsing metadata associated with the first subset in order to identify a first group of applications to or from which the first subset was sent, classifying a second subset of the pool of application data, wherein the classifying the second subset comprises parsing network data associated with the second subset in order to identify a second group of applications to or from which the second subset was sent, and generating a report, wherein the report indicates respective portions of the allotted amount of data that have been consumed by individual applications in the first group of applications and in the second group of applications, and wherein the report further indicates how much of the respective portions were consumed by the first user endpoint device and how much of the respective portions were consumed by the second user endpoint device.

BRIEF DESCRIPTION OF THE DRAWINGS

The teachings of the present disclosure can be understood by readily considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure assists users in managing data usage over a plurality of connected devices. As discussed above, most commercial data plans provide a customer with a limited amount of data to use over a period of time (e.g., 10 Gigabytes per month). However, many customers do not fully understand how their data is being allocated among their devices, and, as a result, the customers may use up their allotted data more quickly than they plan to or expect to. For instance, certain applications may consume more data than a customer realizes. Moreover, due to the growing popularity of the Internet of Things (IoT), which embeds intelligence into traditionally unintelligent devices such as home appliances and systems (e.g., thermostats, doorbells, lighting systems, appliances, and the like), and to the increasing diversity of the wireless communication ecosystem, the demand for data is only expected to increase.

Existing approaches for tracking customer data usage tend to be either too general, or not general enough, to help the average customer effectively manage their data usage. For instance, some service providers offer basic data utilization tools that break a customer's data usage into a limited set of predefined categories (e.g., email messaging, World Wide Web and applications (apps), social media and networking, maps and navigation, downloads, device-to-device communications). However, this provides a high-level view, at best, of the customer's data usage, and fails to break the usage down to the device level or the aggregate level. On the opposite end of the spectrum, some applications and device operating systems may track the data usage on a per-application basis, but these statistics typically ignore device-to-device data usage, and miss broader classifications that might enable effective "whole home" data management. Moreover, even if a customer were able to track all of his data usage perfectly using a collection of tools such as those described above, he would still be unable to manage the actual usage of the data, or the data itself as it travels, from a single point.

Examples of the present disclosure monitor a customer's data usage over a plurality of devices, including, for example, mobile phones, tablet computers, IoT home devices, and other connected devices. Further examples of the present disclosure may provide reports on the data usage by the plurality of devices, where the reports are provided at varying levels of granularity which may be customer-defined. That is, the customer may select the categories of data usage which are reported (e.g., gaming, video streaming, music streaming, texting, social media, device-to-device communications, etc.), and may further configure the reported categories so that the categories are different for each device whose data usage is being monitored. For instance, a parent may wish to monitor the data usage by gaming and video streaming applications on a first child's mobile phone and monitor the data usage by texting and music streaming applications on a second child's mobile phone.

In one example, an open application programming interface (API) allows the plurality of devices, as well as the networks to which the devices are connected and the software applications that are running on the devices, to report data usage directly to a centralized aggregation point (e.g., a server). The aggregation point may then aggregate and classify the data usage information. Metrics derived from the classified data usage information can be used to help customers better understand how their data is being used, and in turn help the customers to better manage their data usage across devices.

Figure 1:
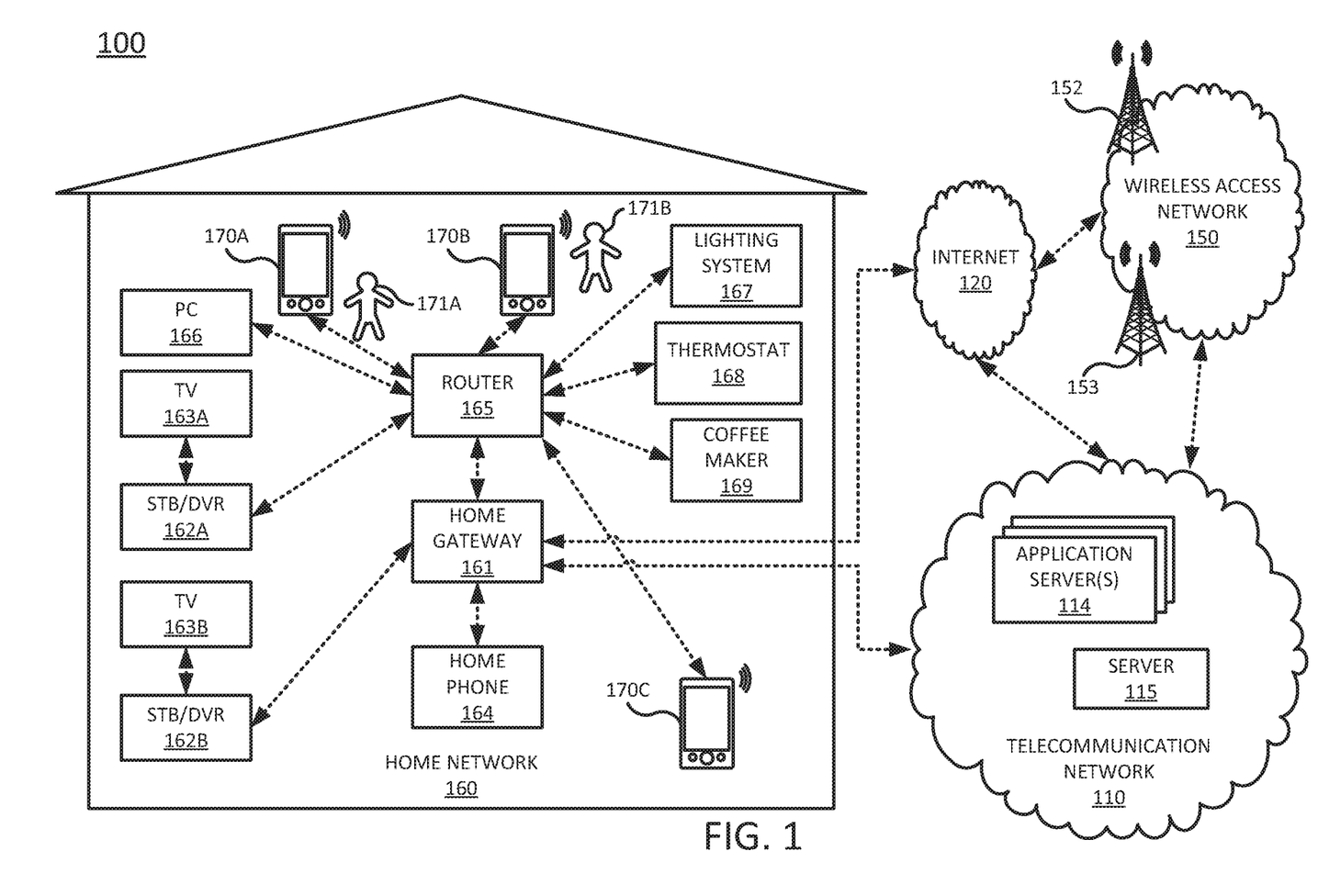
FIG. 1 illustrates an example network related to the present disclosure.

To aid in understanding the present disclosure, FIG. 1 illustrates an example system 100, related to the present disclosure. As shown in FIG. 1, the system 100 connects mobile devices 170A-170C, and home network devices such as home gateway 161, set-top boxes (STBs) 162A and 162B, televisions (TVs) 163A and 163B, home phone 164, router 165, personal computer (PC) 166, lighting system 167, thermostat 168, gaming system 169, and so forth, with one another and with various other devices via a telecommunication network 110, a wireless access network 150 (e.g., a cellular network), and Internet 120. Although a home network is illustrated in FIG. 1, it should be appreciate that examples of the present disclosure could be implemented in environments other than a home. For instance, examples of the present disclosure could be implemented in a factory, an office, a school, an autonomous vehicle, or any other environment in which a plurality of user endpoint devices (potentially including IoT devices) may share access to a data plan that allows the devices to use applications and to communicate.

In one embodiment, each of mobile devices 170A-170C may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one embodiment, any one or more of mobile devices 170A-170C may have both cellular and non-cellular access capabilities and may further have wired communication and networking capabilities. In one example, mobile devices 170A-170C may be used by users 171A-171B, who may be associated with one another as family members, e.g., parents and children, as friends, as co-workers, as caregiver and charge(s), and so forth.

In one example, telecommunication network 110 may combine core network components of a cellular network with components of a triple play service network; where triple-play services include telephone services, Internet services, and television services to subscribers. For example, telecommunication network 110 may functionally comprise a fixed mobile convergence (FMC) network, e.g., an IP Multimedia Subsystem (IMS) network. In addition, telecommunication network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 110 may also further comprise a broadcast television network, e.g., a traditional cable provider network or an Internet Protocol Television (IPTV) network, as well as an Internet Service Provider (ISP) network. For example, with respect to television service provider functions, application servers 114 may represent one or more television servers for the delivery of television content, e.g., a broadcast server, a cable head-end, and so forth. For instance, telecommunication network 110 may comprise a video super hub office, a video hub office and/or a service office/central office. With respect to cellular core network functions, application servers 114 may represent a Home Subscriber Server/Home Location Register (HSS/HLR) for tracking cellular subscriber device location and other functions, a serving gateway (SGW), a packet data network gateway (PGW or PDN GW), a mobility management entity (MME), and so forth. Application servers 114 may further represent an IMS media server (MS) for handling and terminating media streams to provide services such as announcements, bridges, and Interactive Voice Response (IVR) messages for VoIP and cellular service applications.

Figure 5:
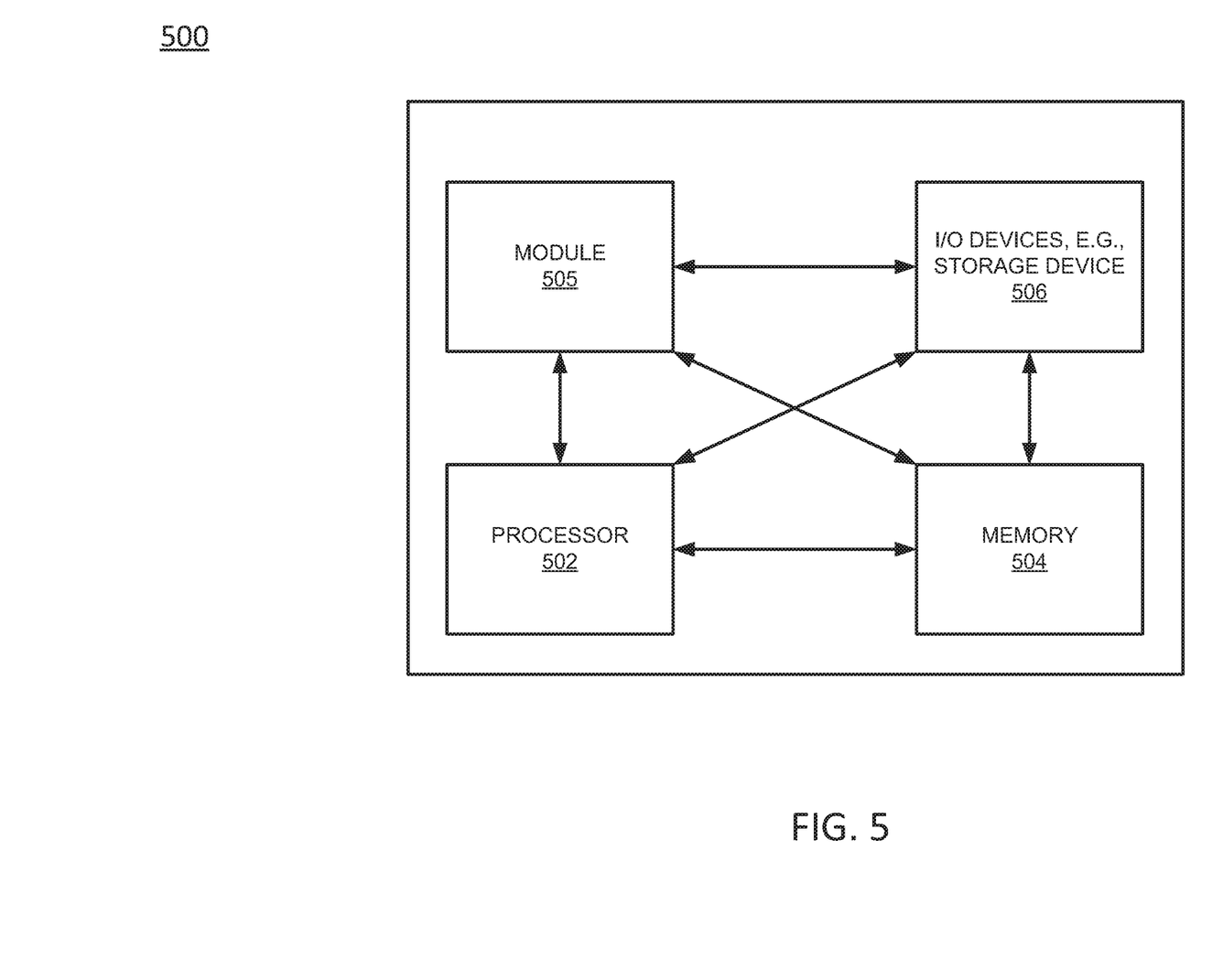
FIG. 5 depicts a high-level block diagram of a computing device specifically programmed to perform the functions described herein.

As shown in FIG. 1, telecommunication network 110 may also include a server 115. In one example, the server 115 may comprise a computing system, such as computing system 500 depicted in FIG. 5, and may be configured to provide one or more functions for aggregating and classifying customer data usage across a plurality of devices in accordance with customer preferences, as described herein. For example, the server 115 may be configured to perform one or more steps, functions, or operations in connection with the example method 200 described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. Furthermore, as referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure. For ease of illustration, various additional elements of telecommunication network 110 are omitted from FIG. 1.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G), or any other yet to be developed future wireless/cellular network technology. While the present disclosure is not limited to any particular type of wireless access network, in the illustrative embodiment, wireless access network 150 is shown as a UMTS terrestrial radio access network (UTRAN) subsystem. Thus, base stations 152 and 153 may each comprise a Node B or evolved Node B (eNodeB). As illustrated in FIG. 1, mobile devices 170A-170C may be in communication with one or both of base stations 152 and 153, which provide connectivity between the mobile devices 170A-170C and other endpoint devices within the system 100, various network-based devices, such as server 115, application servers 114, and so forth. In one example, wireless access network 150 may be operated by the same or a different service provider that is operating telecommunication network 110.

In one example, home network 160 may include a home gateway 161, which receives data/communications associated with different types of media, e.g., television, phone, and Internet, and separates these communications for the appropriate devices. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 170A-170C, lighting system 167, thermostat 168, gaming system 169, and so forth.

In one example, router 165 may further communicate with TV (broadly a display) 163A and/or TV 163B, e.g., where one or both of the televisions is a smart TV. In one example, router 165 may comprise a wired Ethernet router and/or an IEEE 802.11 (Wi-Fi) router, and may communicate with respective devices in home network 160 via wired and/or wireless connections. In this regard, it should be noted that lighting system 167 and thermostat 168 may comprise "smart" appliances (e.g., network-connected devices/Internet of Things (IoT) devices), with wired and/or wireless networking/communication capability. Thus, such appliances may be remotely programmed or configured, and may communicate operational data to remote devices via one or more networks or network links. Similarly, TVs 163A and 163B, STBs/DVRs 162A and 162B, gaming system 169, and/or home phone 164 may also comprise smart appliances with wired and/or wireless networking/communication capability, which may be remotely programmed or configured, and which may communicate operational data to remote devices via one or more networks or network links. For instance, each of these devices may include a transceiver for IEEE 802.11-based communications, for IEEE 802.15-based communications, for wired communications, e.g., for wired Ethernet, and so forth. In this regard, it should be noted that in one example, STBs/DVRs 162A and 162B may also represent streaming media players.

In addition, it should be understood that the system 100 may be implemented in a different form than that which is illustrated in FIG. 1, or may be expanded by including additional endpoint devices, access networks, network elements, application servers, etc. without altering the scope of the present disclosure. For example, telecommunication network 110 is not limited to an IMS network, wireless access network 150 is not limited to a UMTS/UTRAN configuration, and so forth. Similarly, the present disclosure is not limited to an IP/MPLS network for VoIP telephony services, or any particular type of broadcast television network for providing television services. Various other configurations in accordance with the present disclosure are therefore possible. For instance, operations for monitoring data usage across a plurality of user endpoint devices subscribed to a common data plan may be implemented in the home gateway 161 instead of the server 115, the home network 160 may include additional network-connected (e.g., IoT) devices, such as a stereo, a home security system, wireless headphones, a humidistat, a fan, a window, curtains or blinds, a fireplace (e.g., an electric fireplace), an automated scent generator, and so forth. In still another example, devices in home network 160 may be configured to accept instructions from server 115, which resides outside home network 160. In one example, home gateway 161 or router 165 may receive instructions from server 115, and may distribute such instructions to appropriate devices within the home network 160. In such an example, the operator of telecommunication network 110 may therefore provide a service for monitoring data consumption across a plurality of user endpoint devices subscribed to a common data plan, such as devices within the home network 160. Thus, these and other modifications are all contemplated within the scope of the present disclosure.

Figure 2:
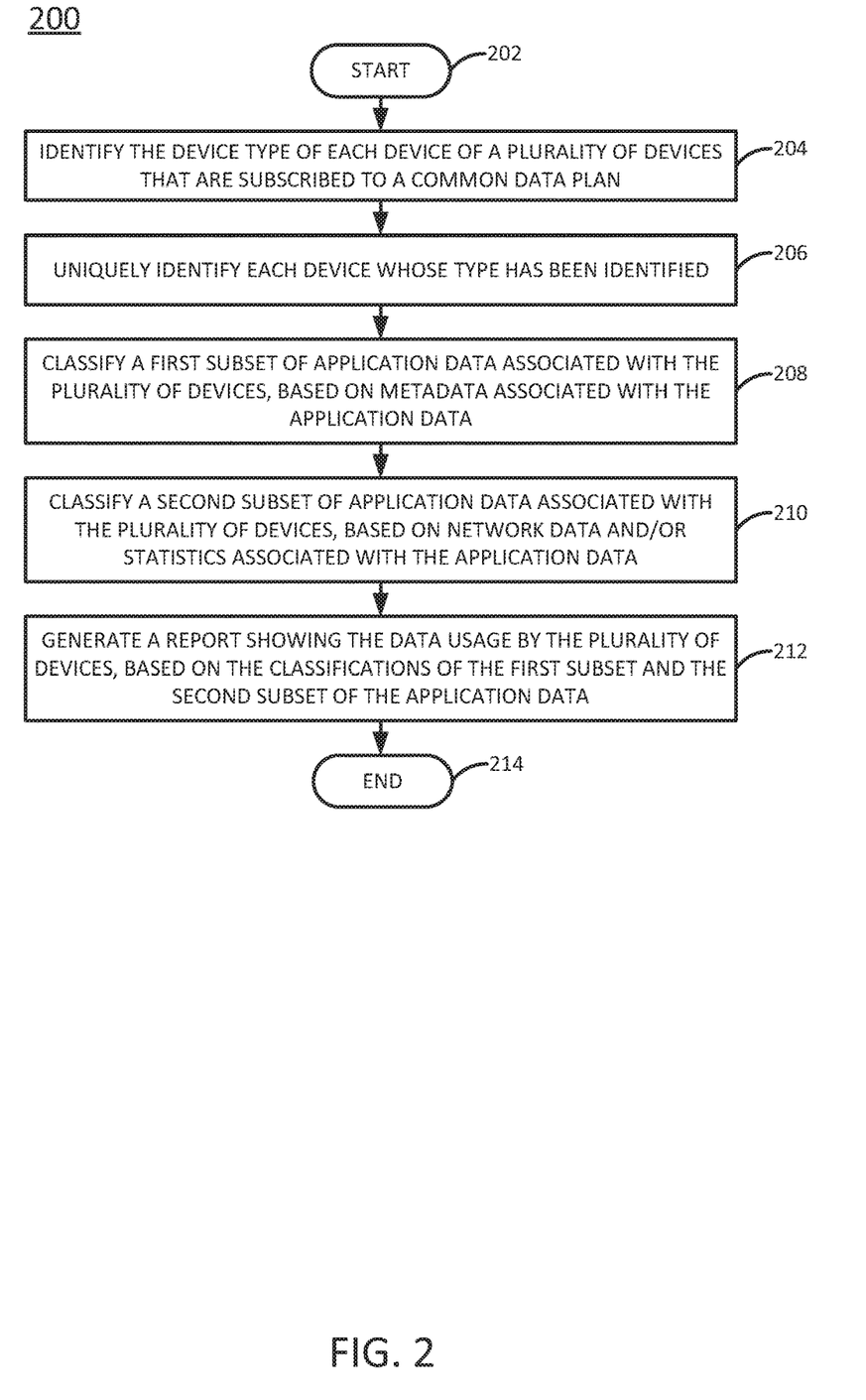
FIG. 2 illustrates a flowchart of an example method for classifying and reporting customer data usage across a plurality of devices, according to examples of the present disclosure.

FIG. 2 illustrates a flowchart of an example method 200 for classifying and reporting customer data usage across a plurality of devices, according to examples of the present disclosure. In one example, the method 200 is performed by one or more components of the system 100 of FIG. 1, such as by device controller 190 and/or server 115 in FIG. 1, and/or any one or more components thereof (e.g., a processor, or processors, performing operations stored in and loaded from a memory), or by device controller 190 and/or server 115 in conjunction with one or more other devices, such as mobile devices 170A-170C, and home network devices such as home gateway 161, set-top boxes (STBs) 162A, and 162B, TVs 163A and 163B, home phone 164, router 165, personal computer (PC) 166, lighting system 167, thermostat 168, gaming system 169, and so forth. In one example, the steps, functions, or operations of method 200 may be performed by a computing device or system 500, and/or processor 502 as described in connection with FIG. 5 below. For instance, the computing device or system 500 may represent any one or more components of device controller 190, server 115, etc. in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 500 may collectively function as a processing system. For illustrative purposes, the method 200 is described in greater detail below in connection with an example performed by a processing system.

The method 200 begins at step 202 and proceeds to step 204.

In step 204, the processing system may identify the device type of each of a plurality of devices (e.g., at least a first device and a second device) that is subscribed to a common data plan. That is, the devices in the plurality of devices shares some allotted amount of data (e.g., 10 Gigabytes per month) between them, where the devices may transmit and receive the allotted amount of data through a telecommunication network (e.g., an IP network). The device type may comprise, for example: mobile phone, tablet computer, IoT device (e.g., smart thermostat or lighting system), gaming system, wearable smart device (e.g., smart watch, smart glasses, etc.), or the like. In one example, knowing the device type of a device will provide insights into the expected data usage. For instance, a mobile phone might be expected to use data for text messaging, email, video and/or music streaming, and/or social media. An IoT device might be expected to use data for messaging. As an example, the IoT device may include sensors that monitor some condition (e.g., the temperature in a home) and report the condition to another device (e.g., a server, a customer's mobile phone, etc.). The IoT device may further receive signals from the other device to control the condition (e.g., raise or lower the temperature in the home). A gaming device might be expected to use the data for gaming.

In step 206, the processing system may uniquely identify each device whose type was identified in step 204. In one example, devices are uniquely identified using customer-assigned device labels that are programmed into the devices. In this case, the customer may configure each device with a label, such as "Shannon's phone," "Roque's tablet," or the like. In another example, devices are uniquely identified by IP address. In this case, the processing system may determine the IP address of a device by examining the headers of IP packets originating with and/or delivered to the device. In another example, an open source network scanner such as the Network Mapper (or Nmap) network scanner may be used. In this case, the processing system may identify devices by sending data packets (e.g., transmission control protocol (TCP) or Internet control message protocol (ICMP) requests) and determining which devices respond to the data packets or have a particular port open.

In step 208, the processing system may classify a first subset of application data associated with the plurality of devices, by parsing the metadata associated with the application data. In one example, the processing system may have access to a pool of application data associated with applications which consume data and which are executing or have executed on the plurality of devices. The pool of application data may include, for example, replicas or logs of packets sent to and/or by the applications. In some examples, the application data may be tagged with metadata from which an application associated with the metadata can be inferred. For instance, certain file types (e.g., image files, hypertext markup language (HTML) files, and the like) may be tagged with application metadata that is inserted by the application used to create or work with the files. Moreover, some specific applications may be known to use specific sets of metadata tags or specific (e.g., proprietary) file extensions. As an example, a file that is tagged with the name of a band and the title of a song by the band may be identified as a music file from a streaming music application.

In one example, the application classes into which the application data is classified may comprise a set number of classes that are selected or defined by the customer. For instance, the classes may include: gaming, video streaming, music streaming, social media, text messaging, email, and the like. Within these classes, applications may be defined with even greater specificity. For instance, the classes may include specific applications that are examples of these application types (e.g., short messaging service text messaging versus messaging through multimedia messaging application X, streaming video of sporting events through application Y versus streaming movies or television shows through application Z, playing games through gaming application A versus playing mobile game B).

In step 210, the processing system may classify a second subset of application data associated with the plurality of devices, based on network data and/or statistics associated with the application data (e.g., bit rates, packets sizes, and the like). In one example, the second subset of the application data may not include sufficient metadata for the application data to be classified with confidence in step 208; thus, the applications used to create or work with the application data may be inferred from the network data and/or statistics.

For instance, multiple packets of the same specific size (or of a certain size), or multiple packets transferred at the same specific bit rate (or at a certain bit rate), that are sent from the same source, may be expected to contain chunks of a video file, which may indicate that the packets are associated with a video streaming application. Correlations between network data and/or statistics and applications may be learned, e.g., through machine learning algorithms such as linear classification (e.g., logistic regression or naïve Bayes classification), nearest neighbor algorithms, support vector machines, decision trees, and/or neural networks applied to network-level behaviors. As in step 208, the application classes into which the application data is classified may comprise the same set number of classes that are selected or defined by the customer.

Thus, steps 208 and 210 may result in the first subset of application data being classified into a first group of applications and the second subset of application data being classified into a second group of applications, where there may or may not be overlap between the first and second group of applications. That is, some application data from the first subset and some application data from the second subset may be classified as being associated with the same application; however, the manner in which the classification is determined may vary for the application data from the first subset and the application data from the second subset.

As discussed above, some application data may be classified as device-to-device communications, e.g., communications between two or more of the user endpoint devices that are subscribed to the data plan (or between a user endpoint device that is subscribed to the data plan and another user endpoint device that is not subscribed to the data plan). Some of these device-to-device communications may be exchanged directly between devices, e.g., without going through the cloud. For instance, communications between IoT devices in a home network, or between IoT devices in a home and a mobile phone of the home owner, may be classified as device-to-device communications. As 5G becomes more commonplace, the ability to easily add IoT devices to a home network and to embed more Internet-connected intelligence into conventionally unconnected devices and systems will drive an increase in the number of device-to-device communications taking place. As such, the ability to predict device-to-device communications and to prevent issues related to malfunctioning communication links will enable service providers, factory managers, heads of households, and the like to ensure smooth operation of devices.

Figure 3:
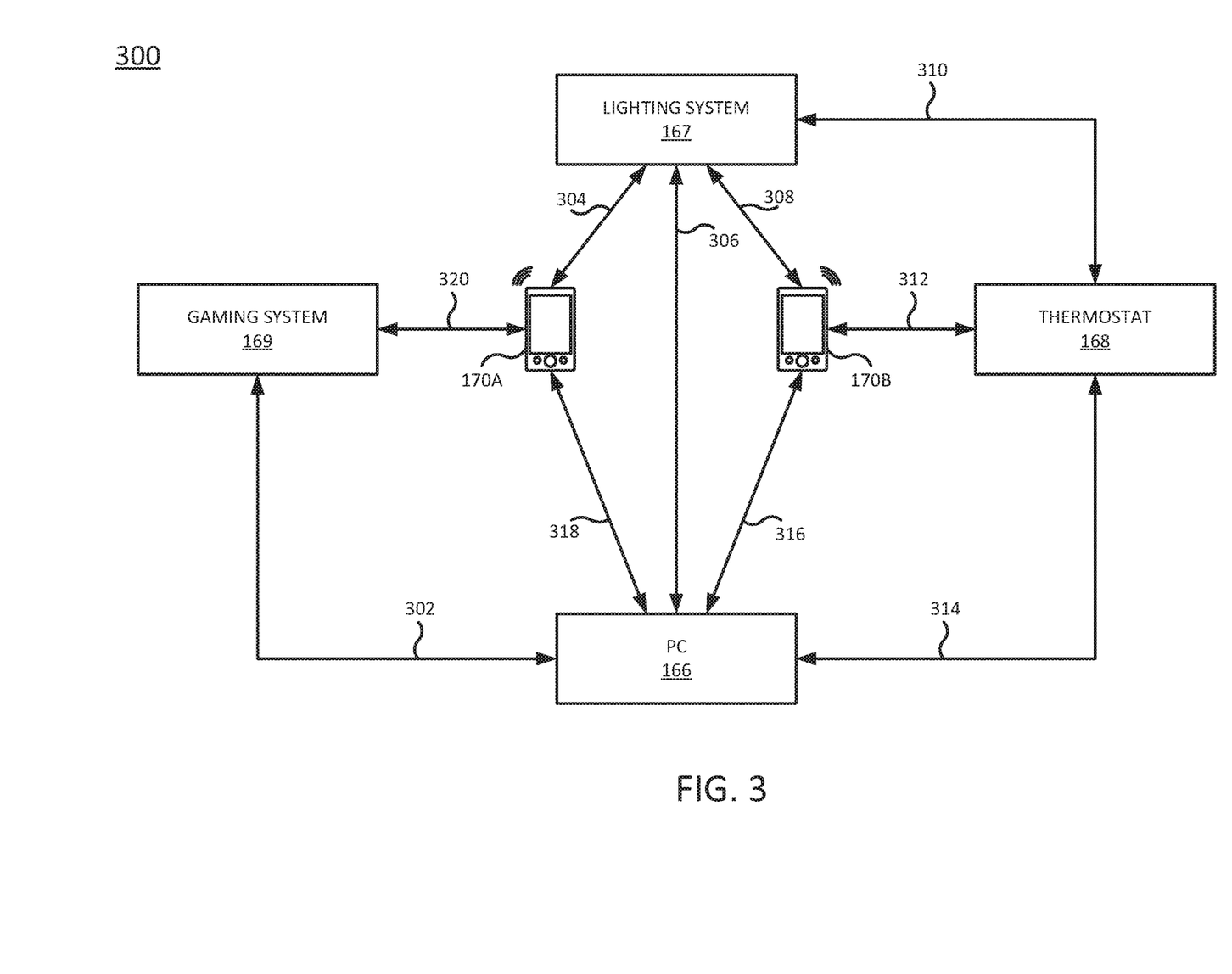
FIG. 3 illustrates one simple example of a virtual map of a customer's user endpoint devices, which may be used to help classify application data in accordance with the method of FIG. 2.

As such, in one example, the processing system may build a "virtual map" of a customer's user endpoint devices (e.g., the user endpoint devices that are subscribed to the customer's data plan) in order to identify when application data indicates device-to-device communications. FIG. 3, for instance, illustrates one simple example of a virtual map 300 of a customer's user endpoint devices, which may be used to help classify application data in accordance with the method 200 of FIG. 2.

FIG. 3 illustrates several of the devices illustrated in FIG. 1 (e.g., mobile devices 170A-170B and home network devices such as PC 166, lighting system 167, thermostat 168, and gaming system 169) and the device-to-device communication links 302-318 that may be inferred from application data. In one example, the communication links 302-318 may be inferred from the headers of data packets in the application data. For instance, by analyzing the IP addresses of the sender and the receiver of a data packet, as listed in the header, a link may be inferred between the devices corresponding to the IP addresses. In addition, any machine learning-based classifications of application data (as inferred in step 210, for instance) may also be used to infer a link between devices. For instance, if machine learning-based classifications indicate that both the mobile device 170B and the thermostat 168 have consumed data in connection with an application that controls the thermostat 168, then a link between the mobile device 170B and the thermostat 168 may be inferred. As discussed above, by building a virtual map such as the virtual map 300 for FIG. 3, the processor may be able to further classify application data that specifically comprises device-to-device communications.

Referring back to FIG. 2, in step 212, the processing system may generate a report that shows how much of the customer's data usage was attributed to each device of the plurality of devices and/or to each application class. In one example, the data usage may be expressed as a percentage of the total data allotted to the customer over a period of time or the total data used by the customer to date (e.g., x percent). In another example, the data usage may be expressed as a quantity of data used over a period of time or used to date (e.g., y Gigabytes).

Figure 4:
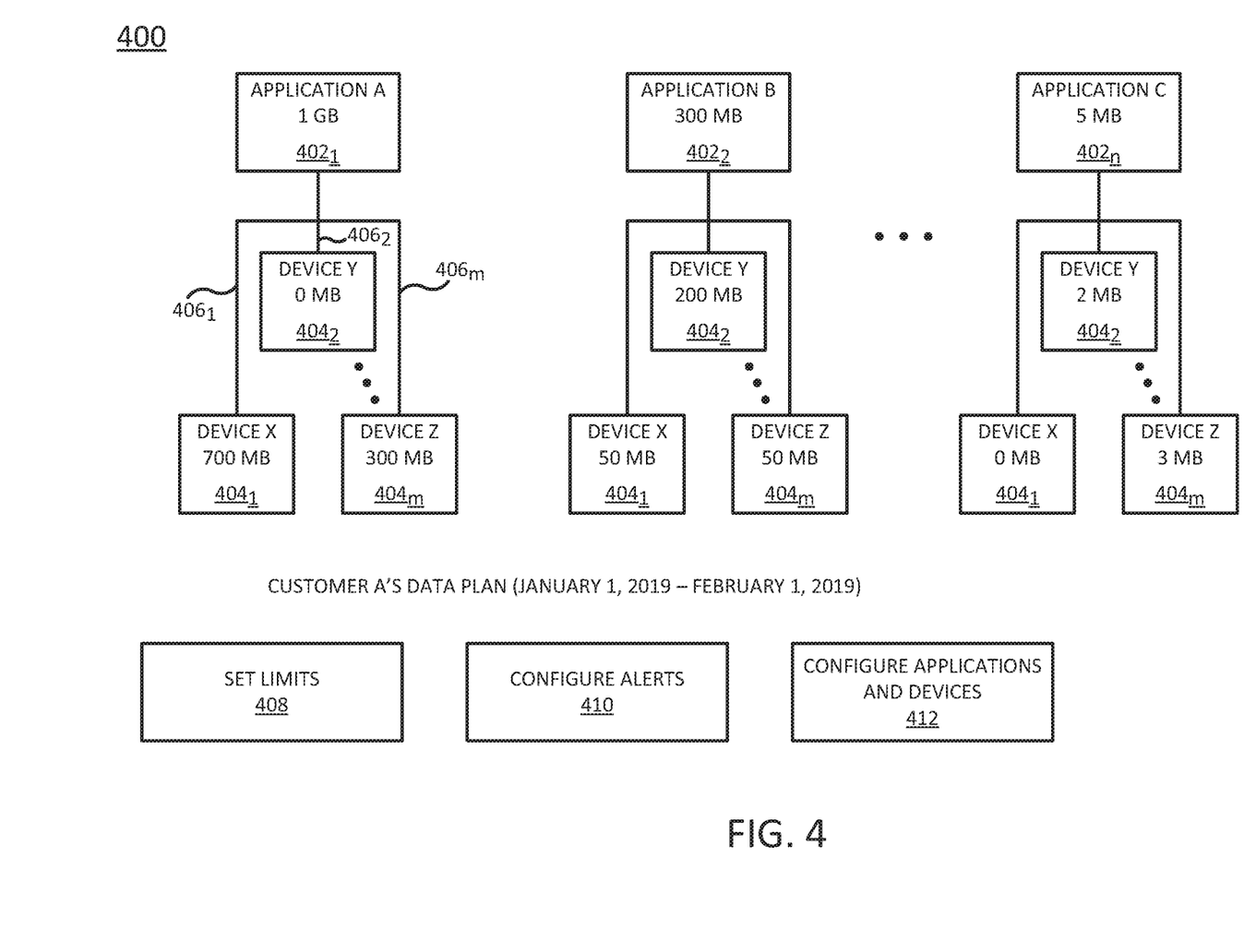
FIG. 4 illustrates one example of a report that may be generated in accordance with the method illustrated in FIG. 2.

FIG. 4, for instance, illustrates one example of a report 400 that may be generated in accordance with the method 200 illustrated in FIG. 2. The report 400 may be presented, for example, on a display of an end user device, and may be interactive in nature. It should be noted that although the example report 400 arranges the information in a tree-like format, the report could present the information in other formats, including pie charts, bar graphs, tables, and other arrangements.

In the example illustrated in FIG. 4, each application that uses a portion of a data plan's allotted data may be represented as a node $402_1$-$402_n$ (hereinafter individually referred to as a "node 402" or collectively referred to as "nodes 402"). Each node 402 may identify the associated application (e.g., Application A, Application B, Application C, etc.) and the amount of data (e.g., in quantity such as Gigabytes, megabytes, etc. or as a percentage of the total data allotment) consumed by the associated application over a period of time. The period of time may be adjustable (e.g., to view the last week, the last month, etc.) and may be defined by the user. In addition, as discussed above, the user may select the applications associated with the nodes 402. In another example, each node 402 may identify a category of application (e.g., video streaming, email, social media, device-to-device communications, etc.) rather than a specific application. In this case, by clicking on a node 402 that defines a broad category of applications, the report may generate another data structure (e.g., another tree) that shows the data usage by each specific application that is grouped within the broad category.

In addition, each end user device that is subscribed to the data plan (and is, therefore, capable of consuming the data allotted to the data plan) may be represented by a node $404_1$-$404_m$ (hereinafter individually referred to as a "node 404" or collectively referred to as "nodes 404"). Thus, each node 404 may represent a mobile phone, a tablet computer, a gaming device, an IoT device, or the like. Each node 404 may identify the associated device, e.g., by IP address, user-defined label, or other identifier (e.g., Device X, Device Y, Device Z, etc.) and the amount of data (e.g., in quantity such as Gigabytes, megabytes, etc. or as a percentage of the total data allotment) consumed by the associated device over the period of time.

An edge $406_1$-$406_m$ (hereinafter individually referred to as an "edge 406" or collectively referred to as "edges 406") between a node 404 and a node 402 indicates that the amount of data identified by the node 404 was used by the associated device while using the application identified by the node 402. For instance, the node $402_1$ indicates that Application A consumed one Gigabyte of the data plan's allotted data between Jan. 1, 2019 and Feb. 1, 2019. The edge $406_1$ between the node $402_1$ and the node $404_1$ associated with Device X indicates that Device X was responsible for consuming 700 megabytes of the one Gigabyte.

It should be noted that modifications can be made to the presentation of the information in the example report 400. For example, the nodes 402 could represent the individual devices subscribed to the data plan, while the nodes 404 represent the applications associated with the individual devices' consumption of data.

In addition, the report 400 may include one or more buttons 408-410 for configuring various customer preferences. For instance, selection of a button 408 for setting limits may allow a customer to limit the amount of data (e.g., by quantity or by percentage) that can be consumed in a given time period (e.g., one week, one month, one billing cycle, etc.) by a category of applications, by a specific application, by a type of device, and/or by a specific device. For instance, the customer could specify that Device X may use no more than one Gigabyte of data on Application A per billing cycle, or that IoT devices may use no more than one Gigabyte of data per billing cycle in general.

Selection of a button 410 for configuring alerts may allow a customer to define rules that determine when and/or how the customer is to be alerted when certain events relating to data usage occur. For instance, the customer could specify that he should be alerted by email when the total amount of data usage by Device Z exceeds two Gigabytes for a current billing cycle. Alternatively, the customer could specify that all devices subscribed to the data plan (and/or other devices not subscribed to the data plan) should be alerted by text message when an IoT smoke detector that subscribes to the data plan is triggered.

Selection of a button 412 for configuring the manner in which the report presents data usage for applications and devices. For instance, the customer may add or delete applications or broad categories of applications whose data usage is monitored. For instance, the customer may close his account with a specific social media application and may therefore wish to remove the social media application from the reports. The customer may also add or delete devices whose data usage is monitored. For instance, if the customer purchases a new device that is subscribed to the data plan, the customer may wish to add the new device to the reports.

The report 400 may be further customized to show other types of information not shown in FIG. 4. For instance, the report 400 could be customized to show data usage at specific times of day (e.g., hourly, morning/afternoon/night, etc.). Thus, a customer might be able to determine that a teenage son or daughter is consuming the most amount of data after 8:00 PM, while using a social media application on his or her mobile phone.

Referring back to FIG. 2, the method 200 may return to step 204 and repeat steps 204 to 212, so that reports are continuously updated as data is consumed across the plurality of devices. Thus, any time that a customer accesses a report (e.g., by logging into a web site or launching an application on an end user device, so that the report is presented on a display of the end user device), the information displayed in the report may be up to date.

Thus, the method 200 provides data usage statistics with a level of granularity that can be customized by the customer. Machine learning applied on network-level behaviors may be used to classify data packets associated applications that cannot be classified with confidence based on metadata, while data analytics may be used to classify data packets for which metadata is available. By breaking data usage down into these specific, customer-defined categories, customers can be provided with greater insight into the types and amounts of data that are being consumed by specific applications (or types of applications), on specific devices (or types of devices), and even at what times the devices (or types of devices) are consuming the different types of data. Thus, customers may be able to better manage their data usage across their devices. For instance, a customer could set limits on the amount of data that specific applications, devices, types of applications, and/or types of devices may consume. Where the customer has multiple options for connectivity available (e.g., cellular, public or private WiFi, etc.), the customer may configure his or her devices or applications to always connect using a specific connectivity option (e.g., WiFi) when available.

However, the benefits of greater data usage insight are not limited to the home network context. For instance, a report such as that generated by the method 200 could also be used to improve enterprise infrastructure optimization. As an example, the lighting system of a factory may include motion-activated light fixtures that turn on only when a sensor detects motion within some predefined physical radius. A report could indicate which light fixtures are on most often and which light fixtures are off most often. This information, in turn, could be used to reallocate resources to the areas of the factory that are most populated/see the greatest amounts of activity in order to reduce energy consumption.

Moreover the method 200 can provide statistics on device-to-device data usage in addition to device-to-cloud data usage. As discussed above, some devices, including mobile devices, IoT devices, and other home devices may consume data over a cellular network simply when communicating with each other (e.g., configuring the settings of a smart thermostat via mobile phone, receiving text message alerts when a smart doorbell detects a presence at the front door of the home, etc.). A report such as that generated by the method 200 allows a customer to effectively monitor and manage device-to-device communications. For instance, the customer may configure IoT devices to connect to a home WiFi network rather than a cellular network, in order to conserve data.

In further examples, customers may be able to extend the functionalities of the present disclosure via plug-and-play software tools (e.g., Web browser extensions) to better manage data usage. These tools may be provided via commercial software developers, or may even be "crowdsourced" from the customers themselves. This may allow for the creation of custom components for functionalities that allow customers to add basic, predefined functions to their reports, including scheduling, time and/or data usage limits, anomaly detection, and other functions.

For instance, a customer could use a scheduling functionality to disable data access by their children's mobile phones after 8:00 PM on school nights, or to disable device-to-device communications between the dishwasher and the over after 5:00 PM. Examples of the present disclosure could convert the defined scheduling times into Coordinated Universal Time (UTC) to create stop points in the network time protocol (NTP) of the consumer's network. Further examples of the present disclosure could monitor network statistics (e.g., bit rate, packet count, etc.) after the stop points occur in order ensure that the defined schedule is being followed.

As another example, a customer could set a time allowance on specific user endpoint devices and/or certain applications such that, once the time allowance has been exceeded, no further data may be allocated to the user endpoint devices and/or applications until a predefined time (e.g., the next day, the next billing cycle, etc.). Alternatively, data to the user endpoint devices and/or applications could be throttled. This would allow the customer to meter data consumption by specific user endpoint devices and/or applications.

As yet another example, the customer could enable security features through the use of anomaly detection. For instance, anomaly detection could allow a customer to detect when a user endpoint device that is subscribed to a data plan has been compromised (e.g., by a computer virus, malware, or the like) and to automatically suspend the comprised device's access to data. In one example, machine learning techniques such as those discussed above could be used to detect anomalies. For instance, machine learning could be used to determine a baseline for expected device behavior (where the device behavior may be defined in terms of total amount of data consumed over a given time period, amount of data consumed when using specific applications, and/or amount of data consumed during specific times of day). Then, when a deviation from the baseline is detected that is larger than a threshold, an anomaly may be reported. For instance, if a specific user endpoint device never consumes data between the hours of 10:00 PM and 6:00 AM, and suddenly the specific user endpoint device is detected consuming 500 megabytes of data at 2:00 AM, the data consumption at 2:00 AM may be reported as an anomaly.

In one example, an anomaly may first be reported to a customer, in order to give the customer an opportunity to respond before data access is suspended. For instance, an alert may be send to the customer's mobile device or email requesting that the anomaly be verified as a permitted usage of data. As an example, the customer might be having trouble sleeping and decide to stream a movie. If no response is received from the customer, or if the customer responds and does not verify the anomaly, then data access to the user endpoint device may be suspended. In other examples, however, the data access to the user endpoint device may be suspended automatically, e.g., as soon as the anomaly is detected. In this case, the customer may have to respond to a request to verify the anomaly before the data access to the user endpoint device is restored.

Still further examples of the present disclosure may provide customers with greater insight into where, in the internet, their data is being sent. This may allow, for instance, the establishment of a neighborhood alert system. For example, if the security alarm in a customer's home goes off, then a text message may be sent to every mobile device within a predefined radius of the customer's home.

It should be noted that the method 200 may be expanded to include additional steps, or may be modified to replace steps with different steps, to combine steps, to omit steps, to perform steps in a different order, and so forth. In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1 or described in connection with the method 200 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for monitoring data consumption across a plurality of user endpoint devices subscribed to a common data plan, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for monitoring data consumption across a plurality of user endpoint devices subscribed to a common data plan (e.g., a software program comprising computer-executable instructions) can be loaded into memory 504 and executed by hardware processor element 502 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for monitoring data consumption across a plurality of user endpoint devices subscribed to a common data plan (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
   identifying, by a processing system in an internet protocol network, a first user endpoint device and a second user endpoint device that are subscribed to a data plan, wherein the data plan allows the first user endpoint device and the second user endpoint device to transmit and receive an allotted amount of data through the internet protocol network, and wherein the allotted amount of data is shared between the first user endpoint device and the second user endpoint device;
   classifying, by the processing system, a first subset of a pool of application data associated with the data plan, wherein the classifying the first subset comprises parsing metadata associated with the first subset in order to identify a first group of applications to or from which the first subset was sent;
   classifying, by the processing system, a second subset of the pool of application data, wherein the classifying the second subset comprises parsing network data associated with the second subset in order to identify a second group of applications to or from which the second subset was sent; and
   generating, by the processing system, a report, wherein the report indicates respective portions of the allotted amount of data that have been consumed by individual applications in the first group of applications and in the second group of applications, and wherein the report further indicates how much of the respective portions were consumed by the first user endpoint device and how much of the respective portions were consumed by the second user endpoint device.

2. The method of claim 1, wherein the identifying the first user endpoint device and the second user endpoint device comprises identifying a device type of the first user endpoint device and a device type of the second user endpoint device.

3. The method of claim 2, wherein the device type of the first user endpoint device is different from the device type of the second user endpoint device.

4. The method of claim 2, wherein at least one of the first user endpoint device and the second user endpoint device is an internet of things device.

5. The method of claim 1, wherein the identifying the first user endpoint device and the second user endpoint device comprises uniquely identifying the first user endpoint device and the second user endpoint device.

6. The method of claim 5, wherein the identifying comprises identifying a customer-assigned label that is programmed into at least one of the first user endpoint device and the second user endpoint device.

7. The method of claim 5, wherein the identifying comprises identifying an internet protocol address of at least one of the first user endpoint device and the second user endpoint device.

8. The method of claim 5, wherein the identifying comprises:
   sending data packets; and
   determining, by a network scanner, that the first user endpoint device and the second user endpoint device have responded to the data packets.

9. The method of claim 1, wherein the first subset of the pool of application data comprises a plurality of data packets sent to or by the first group of applications.

10. The method of claim 9, wherein the parsing the metadata comprises:
    detecting a tag associated with a data packet of the plurality of data packets; and
    inferring, based on the tag, an application of the first group of applications from or to which the data packet was sent.

11. The method of claim 1, wherein the second subset of the pool of application data comprises a plurality of data packets sent to or by the second group of applications.

12. The method of claim 11, wherein the parsing the network data comprises:
    inferring a type of data contained in a data packet of the plurality of data packets, based on the network data; and
    inferring, based on the type of data, an application of the second group of applications from or to which the data packet was sent.

13. The method of claim 12, wherein a correlation between the type of data and the application of the second group of applications is learned using machine learning.

14. The method of claim 1, wherein there is overlap between the first group of applications and the second group of applications.

15. The method of claim 1, wherein a customer has requested inclusion of the first group of applications and the second group of applications in the report.

16. The method of claim 1, wherein an application of the first group of applications comprises device-to-device communications.

17. The method of claim 1, further comprising:
detecting, by the processing system, an anomaly in the application data, wherein the anomaly comprises a deviation from a pattern of usage of the allotted amount of data by the first user endpoint device.

18. The method of claim 17, further comprising:
suspending, by the processing system, access to the allotted amount of data by the first user endpoint device, in response to the detecting.

19. A device, comprising:
a processing system in an internet protocol network; and
a computer-readable medium storing instructions which, when executed by the processing system, cause the processing system to perform operations, the operations comprising:
identifying a first user endpoint device and a second user endpoint device that are subscribed to a data plan, wherein the data plan allows the first user endpoint device and the second user endpoint device to transmit and receive an allotted amount of data through the internet protocol network, and wherein the allotted amount of data is shared between the first user endpoint device and the second user endpoint device;
classifying a first subset of a pool of application data associated with the data plan, wherein the classifying the first subset comprises parsing metadata associated with the first subset in order to identify a first group of applications to or from which the first subset was sent;
classifying a second subset of the pool of application data, wherein the classifying the second subset comprises parsing network data associated with the second subset in order to identify a second group of applications to or from which the second subset was sent; and
generating a report, wherein the report indicates respective portions of the allotted amount of data that have been consumed by individual applications in the first group of applications and in the second group of applications, and wherein the report further indicates how much of the respective portions were consumed by the first user endpoint device and how much of the respective portions were consumed by the second user endpoint device.

20. A non-transitory computer-readable medium storing instructions which, when executed by a processing system of an internet protocol network, cause the processing system to perform operations, the operations comprising:
identifying a first user endpoint device and a second user endpoint device that are subscribed to a data plan, wherein the data plan allows the first user endpoint device and the second user endpoint device to transmit and receive an allotted amount of data through the internet protocol network, and wherein the allotted amount of data is shared between the first user endpoint device and the second user endpoint device;
classifying a first subset of a pool of application data associated with the data plan, wherein the classifying the first subset comprises parsing metadata associated with the first subset in order to identify a first group of applications to or from which the first subset was sent;
classifying a second subset of the pool of application data, wherein the classifying the second subset comprises parsing network data associated with the second subset in order to identify a second group of applications to or from which the second subset was sent; and
generating a report, wherein the report indicates respective portions of the allotted amount of data that have been consumed by individual applications in the first group of applications and in the second group of applications, and wherein the report further indicates how much of the respective portions were consumed by the first user endpoint device and how much of the respective portions were consumed by the second user endpoint device.

* * * * *